(12) United States Patent
Sato et al.

(10) Patent No.: US 11,394,039 B2
(45) Date of Patent: Jul. 19, 2022

(54) ELECTRO-CHEMICAL REACTION UNIT HAVING GLASS SEAL MEMBER COMPOSED OF VERTICALLY LONG CRYSTAL GRAINS, AND ELECTRO-CHEMICAL REACTION CELL STACK, AND ELECTRO-CHEMICAL REACTION UNIT PRODUCTION METHOD COMPRISING SAME

(71) Applicant: MORIMURA SOFC TECHNOLOGY CO., LTD., Komaki (JP)

(72) Inventors: Yoshiaki Sato, Nagoya (JP); Ryoji Tanimura, Nagoya (JP); Kenta Eguchi, Nagoya (JP); Makoto Kuribayashi, Nagoya (JP)

(73) Assignee: MORIMURA SOFC TECHNOLOGY CO., LTD., Komaki (JP)

( * ) Notice: Subject to any disclaimer, the term of this patent is extended or adjusted under 35 U.S.C. 154(b) by 374 days.

(21) Appl. No.: 16/462,669

(22) PCT Filed: Nov. 22, 2017

(86) PCT No.: PCT/JP2017/041992
§ 371 (c)(1),
(2) Date: May 21, 2019

(87) PCT Pub. No.: WO2018/097174
PCT Pub. Date: May 31, 2018

(65) Prior Publication Data
US 2020/0083545 A1    Mar. 12, 2020

(30) Foreign Application Priority Data
Nov. 22, 2016  (JP) .............................. JP2016-226504

(51) Int. Cl.
*H01M 8/0282* (2016.01)
*H01M 8/0286* (2016.01)
(Continued)

(52) U.S. Cl.
CPC ....... *H01M 8/0282* (2013.01); *H01M 8/0273* (2013.01); *H01M 8/0286* (2013.01);
(Continued)

(58) Field of Classification Search
CPC .... H01M 8/0282; H01M 8/0286; H01M 8/12; H01M 8/2425; H01M 2008/1293;
(Continued)

(56) References Cited

U.S. PATENT DOCUMENTS

| | | | |
|---|---|---|---|
| 6,541,146 B1 | 4/2003 | Xue et al. | |
| 2005/0147866 A1* | 7/2005 | Ko | C03C 8/24 429/510 |

(Continued)

FOREIGN PATENT DOCUMENTS

| | | | | |
|---|---|---|---|---|
| EP | 0620608 A1 * | 4/1994 | .............. | H01M 8/02 |
| EP | 3 016 192 A1 | 5/2016 | | |

(Continued)

OTHER PUBLICATIONS

Communication dated Jul. 2, 2020, issued by the Korean Intellectual Property Office in Korean Application No. 10-2019-7014484.
(Continued)

*Primary Examiner* — Kwang Han
(74) *Attorney, Agent, or Firm* — Sughrue Mion, PLLC (57) ABSTRACT

An electrochemical reaction unit includes a unit cell including an electrolyte layer, and a cathode and an anode which face each other in a first direction with the electrolyte layer intervening therebetween, and one or a plurality of structural members. The electrochemical reaction unit further includes a glass seal member which contains glass and is in contact (Continued)

with two members facing each other in the first direction, the two members being selected from the unit cell and the one or the plurality of structural members. The glass seal member contains a plurality of crystal grains each having a ratio of a vertical dimension in the first direction to a horizontal dimension in a second direction orthogonal to the first direction of 1.5 or more.

13 Claims, 7 Drawing Sheets

(51) Int. Cl.
   *H01M 8/2425* (2016.01)
   *H01M 8/0273* (2016.01)
   *H01M 8/12* (2016.01)

(52) U.S. Cl.
   CPC ............ *H01M 8/12* (2013.01); *H01M 8/2425* (2013.01); *H01M 2008/1293* (2013.01)

(58) Field of Classification Search
   CPC .. H01M 8/0273; H01M 8/2483; H01M 8/248; H01M 8/2432; H01M 8/0202; C25B 1/04; C25B 9/73; Y02E 60/50; Y02E 60/36; Y02P 70/50
   See application file for complete search history.

(56) References Cited

U.S. PATENT DOCUMENTS

| | | | |
|---|---|---|---|
| 2005/0164067 | A1 | 7/2005 | Ooshima et al. |
| 2006/0012135 | A1* | 1/2006 | Chou ................... F16J 15/122 277/654 |
| 2010/0331165 | A1 | 12/2010 | Lee et al. |
| 2015/0318563 | A1 | 11/2015 | Kuribayashi et al. |
| 2016/0285113 | A1* | 9/2016 | Di Iorio ............. H01M 8/2457 |
| 2016/0372778 | A1 | 12/2016 | Hotta et al. |

FOREIGN PATENT DOCUMENTS

| | | |
|---|---|---|
| JP | 2000-331692 A | 11/2000 |
| JP | 2005-183376 A | 7/2005 |
| JP | 2014-049325 A | 3/2014 |
| JP | 2015-149271 A | 8/2015 |
| KR | 10-2005-0071887 A | 7/2005 |

OTHER PUBLICATIONS

Communication dated Jun. 19, 2020 issued by the European Intellectual Property Office in counterpart European Application No. 17873340.8.

International Search Report dated May 31, 2018 by the International Searching Authority in International Patent Application No. PCT/JP2017/041992. (PCT/ISA/210).

* cited by examiner

ELECTRO-CHEMICAL REACTION UNIT HAVING GLASS SEAL MEMBER COMPOSED OF VERTICALLY LONG CRYSTAL GRAINS, AND ELECTRO-CHEMICAL REACTION CELL STACK, AND ELECTRO-CHEMICAL REACTION UNIT PRODUCTION METHOD COMPRISING SAME

CROSS REFERENCE TO RELATED APPLICATIONS

This application is a National Stage of International Application No. PCT/JP2017/041992, filed Nov. 22, 2017, claiming priority based on Japanese Patent Application No. 2016-226504, filed, Nov. 22, 2016.

TECHNICAL FIELD

A technique disclosed in the present specification relates to an electrochemical reaction unit.

BACKGROUND ART

A known type of a fuel cell for generating electricity by utilizing electrochemical reaction between hydrogen and oxygen is a solid oxide fuel cell (hereinafter may be referred to as "SOFC"). A fuel-cell electricity generation unit which partially constitutes an SOFC includes a fuel-cell unit cell, a pair of interconnectors, and a separator. The fuel-cell unit cell includes an electrolyte layer, a cathode, and an anode such that the cathode and the anode face each other in a first direction and such that the electrolyte layer intervenes between these electrodes. The paired interconnectors face each other in the first direction with the fuel-cell unit cell intervening therebetween. The separator has a through hole formed therein, and a portion around the through hole is joined (e.g., bonded) to a peripheral portion of the fuel-cell unit cell, whereby the separator separates from each other a cathode chamber facing the cathode and an anode chamber facing the anode.

In the fuel-cell electricity generation unit, in some cases, a glass seal member formed through crystallization of a glass material is disposed in a space between two structural members facing each other in the first direction (e.g., the separator and the interconnector mentioned above) in order to provide electrical insulation and a gas seal between the two structural members (see, for example, Patent Document 1).

PRIOR ART DOCUMENT

Patent Document

Patent Document 1: Japanese Patent Application Laid-Open (kokai) No. 2005-183376

SUMMARY OF THE INVENTION

Problem to be Solved by the Invention

Two structural members in contact with the glass seal member thermally expand as a result of an electricity generating operation of the fuel-cell electricity generation unit. On this occasion, because of difference in thermal expansion between the two structural members, a difference may arise between the amount by which a portion of the glass seal member located toward one structural member is stretched in a second direction orthogonal to the first direction by the one structural member and the amount by which a portion of the glass seal member located toward the other structural member is stretched in the second direction by the other structural member. Accordingly, cracking in the second direction may occur in the glass seal member. As a result, the sealing performance between the structural members may be impaired.

Such a problem arises in not only an SOFC having a flat-plate shape but also an SOFC having a cylindrical shape. Such a problem also arises in an electrolysis cell unit which partially constitutes a solid oxide electrolysis cell (hereinafter may be referred to as "SOEC") for generating hydrogen by utilizing electrolysis of water. In the present specification, a fuel-cell unit cell and an electrolysis cell are collectively referred to as an electrochemical reaction unit cell, and a fuel-cell electricity generation unit and an electrolysis cell unit are collectively referred to as an electrochemical reaction unit.

The present specification discloses a technique capable of at least partially solving the aforementioned problems.

Means for Solving the Problem

A technique disclosed in the present specification can be implemented in the following modes.

(1) An electrochemical reaction unit disclosed in the present specification comprises a unit cell including an electrolyte layer, and a cathode and an anode which face each other in a first direction with the electrolyte layer intervening therebetween; and one or a plurality of structural members, the electrochemical reaction unit being characterized by further comprising a glass seal member which contains glass and is in contact with two members facing each other in the first direction, the two members being selected from the unit cell and the one or the plurality of structural members, and characterized in that the glass seal member contains a plurality of crystal grains each having a ratio of a vertical dimension in the first direction to a horizontal dimension in a second direction orthogonal to the first direction of 1.5 or more. According to the present electrochemical reaction unit, the glass seal member contains a plurality of crystal grains (hereinafter may be referred to as "vertically long crystal grains") each having a ratio of a vertical dimension to a horizontal dimension of 1.5 or more. Accordingly, even when stress is developed in the glass seal member due to difference in thermal expansion between two members between which a seal is provided, by virtue of the vertically long crystal grains, vertical cracking in the first direction (vertical direction) is apt to occur in the glass seal member preferentially to horizontal cracking in the second direction (horizontal direction) and can release the stress. That is, preferential occurrence of cracking in the first direction in which two members face each other restrains occurrence of cracking in the second direction, thereby restraining the passage of gas between the two members. Therefore, there can be restrained impairment of sealing performance between two members between which a seal is provided.

(2) In the electrochemical reaction unit, the two members are the unit cell, and the structural member which at least partially faces the unit cell in the first direction. According to the present electrochemical reaction unit, there can be restrained impairment of sealing performance between the unit cell and the structural member.

(3) In the electrochemical reaction unit, the structural member which faces the unit cell is a separator which has a through hole formed therein; whose portion around the through hole is joined to a peripheral portion of the unit cell; and which separates from each other a cathode chamber facing the cathode and an anode chamber facing the anode. According to the present electrochemical reaction unit, there can be restrained impairment of sealing performance between the unit cell and the separator.

(4) In the electrochemical reaction unit, the two members are a first structural member and a second structural member which face each other in the first direction. According to the present electrochemical reaction unit, the glass seal member contains vertically long crystal grains. Accordingly, even though stress is generated in the glass seal member due to thermal expansion difference between the first structural member and the second structural member, since, by virtue of the vertically long crystal grains, vertical cracking extending in the first direction (vertical direction) is apt to occur in the glass seal member preferentially to horizontal cracking extending in the second direction (horizontal direction), horizontal cracking can release the stress. That is, preferential occurrence of cracking in the first direction in which the first structural member and the second structural member face each other restrains occurrence of cracking in the second direction, thereby restraining the passage of gas between the first structural member and the second structural member. Therefore, there can be restrained impairment of sealing performance between the first structural member and the second structural member.

(5) In the electrochemical reaction unit, one of the first structural member and the second structural member is an interconnector. Therefore, there can be restrained impairment of sealing performance between the interconnector and the structural member which faces the interconnector.

(6) The electrochemical reaction unit may be configured such that the vertical dimension of at least one of the crystal grains is 30% or more of a thickness of the glass seal member in the first direction. According to the present electrochemical reaction unit, since the vertical dimension of at least one of the crystal grains is 30% or more of the thickness of the glass seal member in the vertical direction (first direction), vertical cracking is apt to occur in the glass seal member further preferentially to horizontal cracking. Therefore, there can be more effectively restrained impairment of sealing performance between the unit cell and the structural member or between the first structural member and the second structural member.

(7) The electrochemical reaction unit may be configured such that the vertical dimension of at least one of the crystal grains is 50% or more of a thickness of the glass seal member in the first direction. According to the present electrochemical reaction unit, since the vertical dimension of at least one of the crystal grains is 50% or more of the thickness of the glass seal member in the vertical direction (first direction), even if horizontal cracking occurs, the development of the horizontal cracking is apt to be restrained by the crystal grains. As a result, there can be more effectively restrained impairment of sealing performance between the unit cell and the structural member or between the first structural member and the second structural member.

(8) An electrochemical reaction cell stack disclosed in the present specification is configured such that at least one of the electrochemical reaction units is an electrochemical reaction unit as recited in any one of (1) to (7) above.

(9) The present specification discloses a production method for an electrochemical reaction unit which includes a unit cell including an electrolyte layer, and a cathode and an anode facing each other in a first direction with the electrolyte layer intervening therebetween, one or a plurality of structural members, and a glass seal member containing glass and being in contact with two members facing each other in the first direction, the two members being selected from the unit cell and the one or the plurality of structural members, and in which the glass seal member contains a plurality of crystal grains each having a ratio of a vertical dimension in the first direction to a horizontal dimension in a second direction orthogonal to the first direction of 1.5 or more, comprising: a step of preparing the unit cell and the one or the plurality of structural members; a step of disposing between the two members a seed layer containing at least one element of Ba, Ca, Mg, Al, La, Ti, Cr, Zr, and Ce, and glass; and a step of forming the glass seal member by, in a state in which the seed layer and the glass are disposed between the two members, melting the glass, followed by crystallization. The present production method for an electrochemical reaction unit can form between the two members the glass seal member containing vertically long crystal grains, by disposing between the two members a seed layer containing at least one element of Ba, Ca, Mg, Al, La, Ti, Cr, Zr, and Ce, and glass, and melting the glass, followed by crystallization.

(10) In the production method for an electrochemical reaction unit, the two members are the unit cell, and the structural member which at least partially faces the unit cell in the first direction. The present production method for an electrochemical reaction unit can form between the unit cell and the structural member the glass seal member containing vertically long crystal grains by disposing a seed layer containing at least one element of Ba, Ca, Mg, Al, La, Ti, Cr, Zr, and Ce, and glass between the unit cell and the structural member, and melting the glass, followed by crystallization.

(11) In the production method for an electrochemical reaction unit, the two members are a first structural member and a second structural member which face each other in the first direction. The present production method for an electrochemical reaction unit can form between the first structural member and the second structural member the glass seal member containing vertically long crystal grains by disposing a seed layer containing at least one element of Ba, Ca, Mg, Al, La, Ti, Cr, Zr, and Ce, and glass between the first structural member and the second structural member, and melting the glass, followed by crystallization.

The technique disclosed in the present specification can be implemented in various modes; for example, an electrochemical reaction unit (fuel-cell electricity generation unit or electrolysis cell unit), an electrochemical reaction cell stack (fuel cell stack or electrolysis cell stack) including a plurality of electrochemical reaction units, and a production method therefor.

MODES FOR CARRYING OUT THE INVENTION

A. Embodiment

A-1. Structure:
(Structure of Fuel Cell Stack 100)

Figure 1:
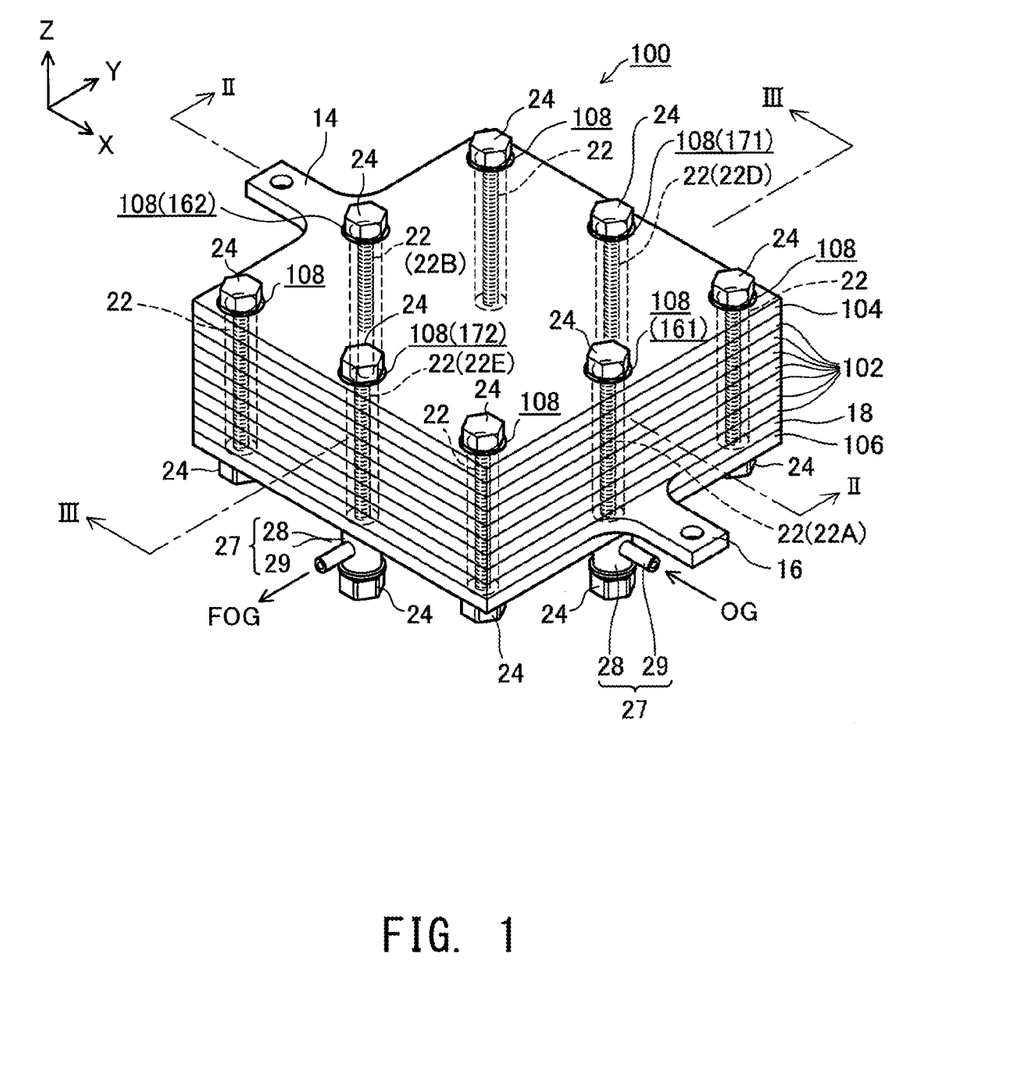
FIG. 1 Perspective view showing the external appearance of a fuel cell stack 100 according to the present embodiment.
Figure 2:
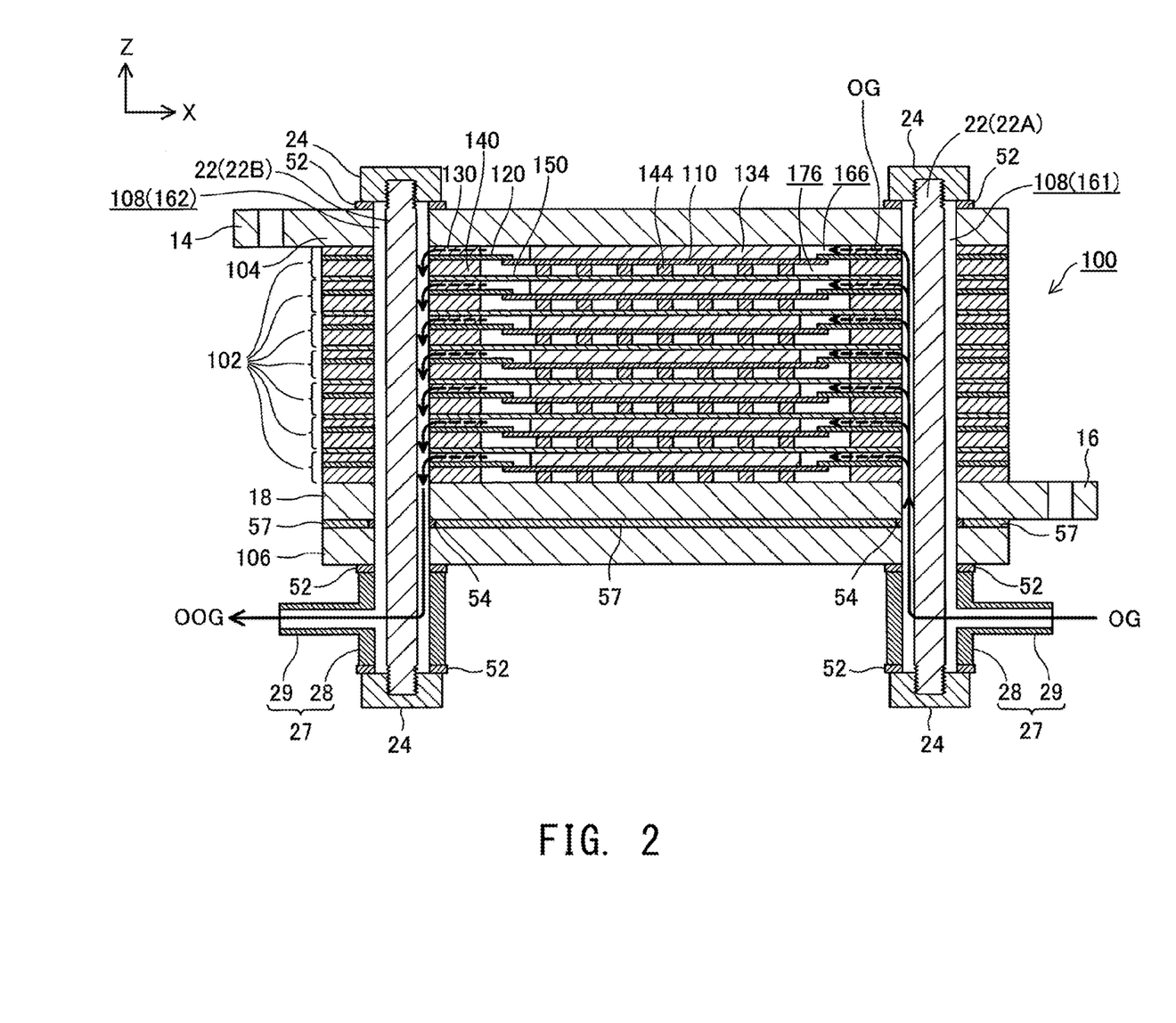
FIG. 2 Explanatory view showing an XZ section of the fuel cell stack 100 taken along line II-II of FIG. 1.
Figure 3:
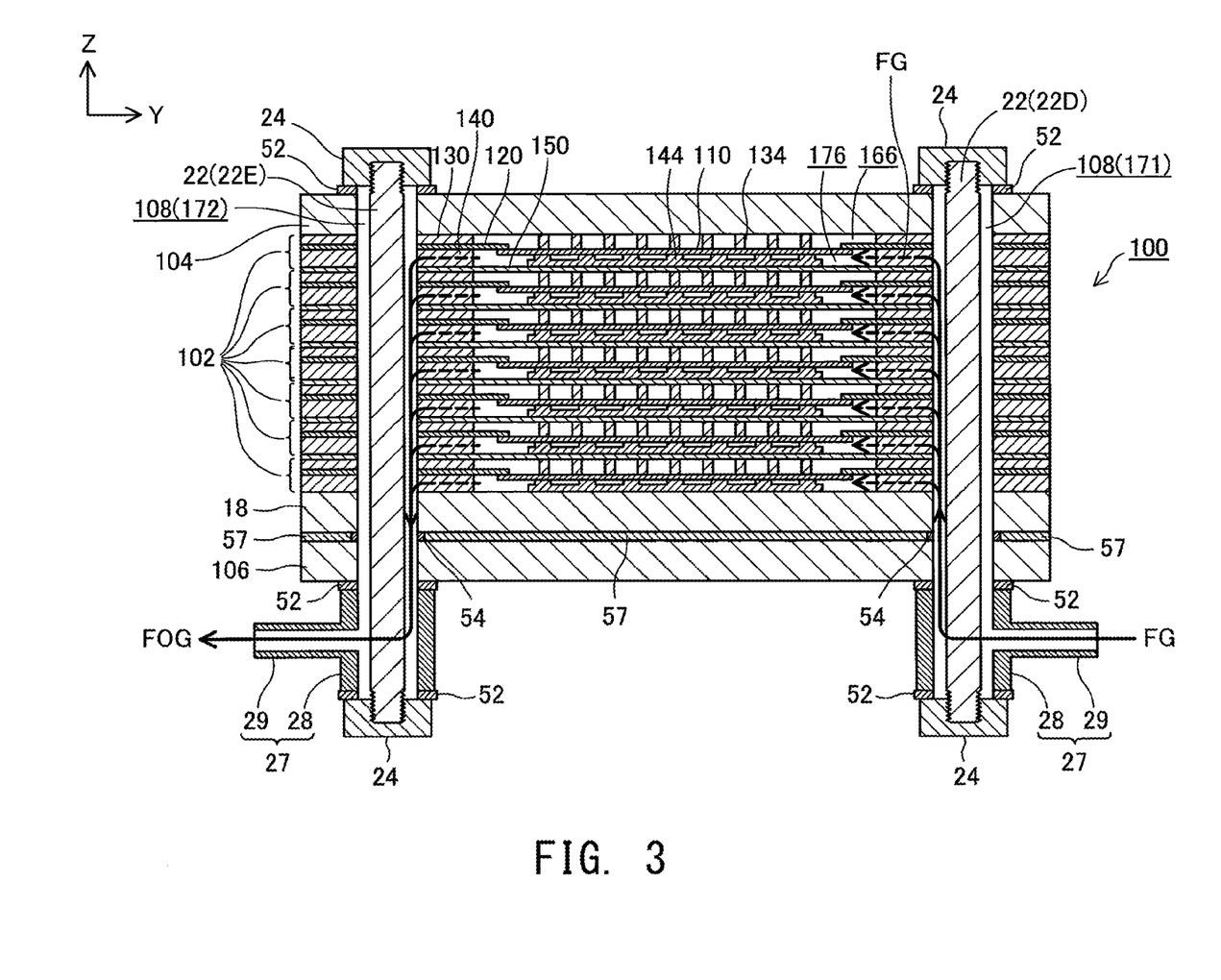
FIG. 3 Explanatory view showing a YZ section of the fuel cell stack 100 taken along line III-III of FIG. 1.

FIG. 1 is a perspective view showing the external appearance of a fuel cell stack 100 according to the present embodiment; FIG. 2 is an explanatory view showing an XZ section of the fuel cell stack 100 taken along line II-II of FIG. 1; and FIG. 3 is an explanatory view showing a YZ section of the fuel cell stack 100 taken along line III-III of FIG. 1. FIGS. 1 to 3 show mutually orthogonal X-axis, Y-axis, and Z-axis for specifying directions. In the present specification, for the sake of convenience, the positive Z-axis direction is called the upward direction and the negative Z-axis direction is called the downward direction; however, in actuality, the fuel cell stack 100 may be disposed in a different orientation. The same also applies to FIG. 4 and subsequent drawings.

The fuel cell stack 100 includes a plurality of (seven in the present embodiment) electricity generation units 102, a first end plate 104, a second end plate 106, and a current collecting plate 18. The seven electricity generation units 102 are disposed in a predetermined direction of array (in the vertical direction (Z-axis direction) in the present embodiment). The current collecting plate 18 is disposed under the bottom electricity generation unit 102. The first end plate 104 is disposed above the top electricity generation unit 102, and the second end plate 106 is disposed under the current collecting plate 18. The direction of array (vertical direction) corresponds to the first direction appearing in CLAIMS.

The fuel cell stack 100 has a plurality of (eight in the present embodiment) of holes formed therein and extending in the vertical direction through peripheral portions about the Z-axis direction of its component layers (the electricity generation units 102, the first and second end plates 104 and 106, and the current collecting plate 18), and the corresponding holes formed in the layers communicate with one another in the vertical direction, thereby forming through holes 108 extending in the vertical direction from the first end plate 104 to the second end plate 106. In the following description, individual holes which constitute each through hole 108 and are formed in the individual layers of the fuel cell stack 100 may also be called the through holes 108.

Bolts 22 extending in the vertical direction are inserted into the corresponding through holes 108, and the fuel cell stack 100 is clamped by means of the bolts 22 and nuts 24 engaged with opposite ends of the bolts 22.

The outside diameter of a shaft portion of each bolt 22 is smaller than the inside diameter of each through hole 108. Accordingly, a space exists between the outer circumferential surface of the shaft portion of each bolt 22 and the inner circumferential surface of each through hole 108. As shown in FIGS. 1 and 2, a space defined by the bolt 22 (bolt 22A) located at around the midpoint of one side of the perimeter about the Z-axis direction of the fuel cell stack 100 (a side at the positive side in the X-axis direction of two sides in parallel with the Y-axis) and the through hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102, whereas a space defined by the bolt 22 (bolt 22B) located at around the midpoint of the other side opposite the above side (a side at the negative side in the X-axis direction of two sides in parallel with the Y-axis) and the through hole 108 into which the bolt 22B is inserted functions as an oxidizer gas discharge manifold 162 from which oxidizer offgas OOG discharged from the cathode chambers 166 of the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter about the Z-axis direction of the fuel cell stack 100 (a side at the positive side in the Y-axis direction of two sides in parallel with the X-axis) and the through hole 108 into which the bolt 22D is inserted functions as a fuel gas introduction manifold 171 into which fuel gas FG is introduced from outside the fuel cell stack 100 and which supplies the fuel gas FG to the electricity generation units 102, whereas a space defined by the bolt 22 (bolt 22E) located at around the midpoint of the other side opposite the above side (a side at the negative side in the Y-axis direction of two sides in parallel with the X-axis) and the through hole 108 into which the bolt 22E is inserted functions as a fuel gas discharge manifold 172 from which fuel offgas FOG discharged from the anode chambers 176 of the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 is formed of a metal and has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

As shown in FIGS. 2 and 3, a first glass seal material 52 formed through crystallization of a glass material intervenes between the nuts 24 engaged with first ends (upper ends) of the bolts 22 and the upper surface of the first end plate 104 which constitutes the upper end of the fuel cell stack 100 and between the nuts 24 engaged with second ends (lower ends) of the bolts 22 and the lower surface of the second end plate 106 which constitutes the lower end of the fuel cell stack 100. However, at the positions of the gas passage members 27, the gas passage members 27 and the first glass seal material 52 disposed on the upper and lower sides of the gas passage members 27 intervene between the nuts 24 and the surface of the second end plate 106. The first glass seal material 52 has holes formed therein and communicating with the corresponding through holes 108 and the corresponding holes of the body portions 28 of the gas passage members 27. The first glass seal material 52 electrically insulates from each other two electrically conductive members (e.g., the nut 24 and the first end plate 104) which are adjacent to each other in the direction of array with the first glass seal material 52 intervening therebetween, and provides a gas seal between the two electrically conductive members. The nuts 24 and the first end plate 104 correspond to the first structural member and the second structural member, respectively, appearing in CLAIMS. The first glass seal material 52 corresponds to the glass seal member appearing in CLAIMS.

(Structure of End Plates 104 and 106)

The first and second end plates 104 and 106 are electrically conductive members each having an approximately rectangular flat-plate shape and are formed of, for example, stainless steel. The first end plate 104 has a first protrusion 14 protruding in a direction (e.g., negative X-axis direction) approximately orthogonal to the direction of array. The first protrusion 14 of the first end plate 104 functions as a positive output terminal of the fuel cell stack 100.

(Structure of Current Collecting Plate 18)

The current collecting plate 18 is an electrically conductive member having an approximately rectangular flat-plate shape and is formed of, for example, stainless steel. The current collecting plate 18 has a second protrusion 16 protruding in a direction (e.g., positive X-axis direction) approximately orthogonal to the direction of array. The protrusion 16 of the current collecting plate 18 functions as a negative output terminal of the fuel cell stack 100.

A second glass seal material 54 formed through crystallization of a glass material, and an insulating material 57 such as mica intervene between the current collecting plate 18 and the second end plate 106. The insulating material 57 has holes formed therein at positions corresponding to the aforementioned through holes 108, and the second glass seal material 54 is disposed within the holes. The second glass seal material 54 has holes formed therein and communicating with the above-mentioned through holes 108. The second glass seal material 54 electrically insulates from each other two electrically conductive members; specifically, the current collecting plate 18 and the second end plate 106, disposed adjacent to each other in the direction of array with the second glass seal material 54 intervening therebetween, and provides a gas seal between the current collecting plate 18 and the second end plate 106.

(Structure of Electricity Generation Unit 102)

Figure 4:
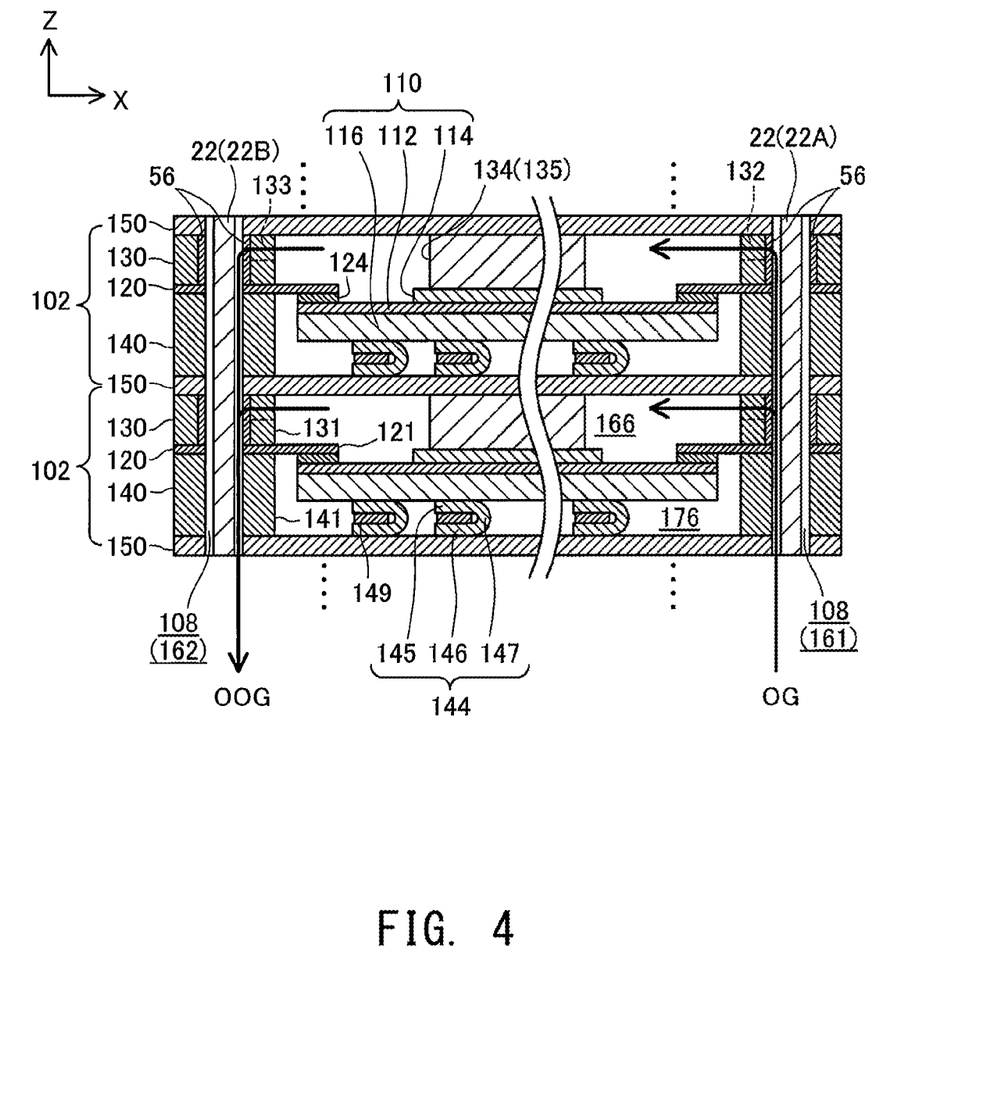
FIG. 4 Explanatory view showing an XZ section of two adjacent electricity generation units 102 at the same position as that of the section shown in FIG. 2.
Figure 5:
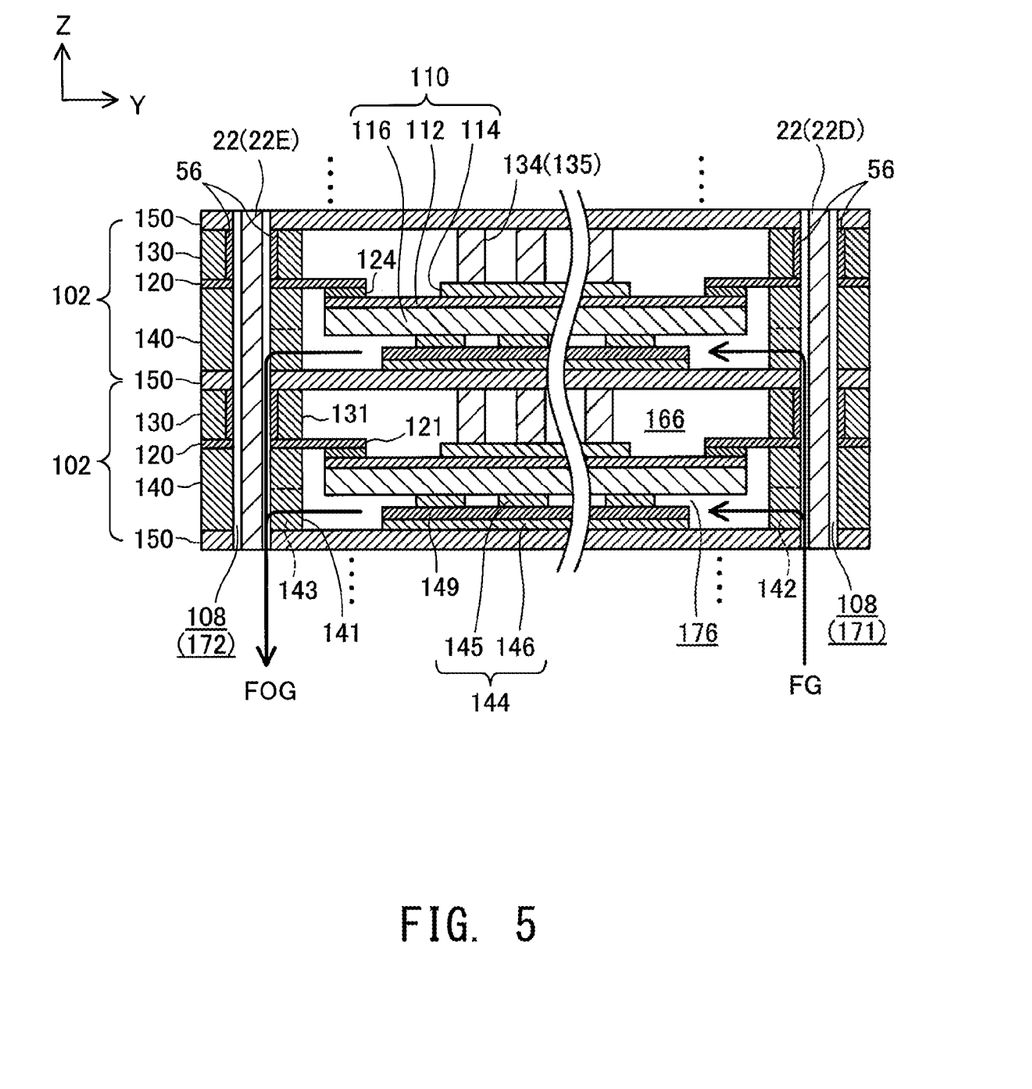
FIG. 5 Explanatory view showing a YZ section of two adjacent electricity generation units 102 at the same position as that of the section shown in FIG. 3.

FIG. 4 is an explanatory view showing an XZ section of two adjacent electricity generation units 102 at the same position as that of the section shown in FIG. 2, and FIG. 5 is an explanatory view showing a YZ section of two adjacent electricity generation units 102 at the same position as that of the section shown in FIG. 3.

As shown in FIGS. 4 and 5, the electricity generation unit 102 serving as the smallest unit of electricity generation includes a unit cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the through holes 108 into which the bolts 22 are inserted are formed in peripheral portions about the Z-axis direction of the separator 120, the cathode-side frame 130, the anode-side frame 140, and the interconnectors 150. Notably, the electricity generation unit 102 corresponds to the electrochemical reaction unit appearing in CLAIMS. Also, the separator 120 corresponds to the structural member appearing in CLAIMS. Further, one of the paired interconnectors 150 and the separator 120 correspond to the first structural member and the second structural member, respectively, appearing in CLAIMS.

The interconnector 150 is an electrically conductive member having an approximately rectangular flat plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Accordingly, a certain interconnector 150 faces the cathode chamber 166 which faces an after-mentioned cathode 114 in the certain electricity generation unit 102, and faces the anode chamber 176 which faces an after-mentioned anode 116 in the upper adjacent electricity generation unit 102. Also, since the fuel cell stack 100 has the first end plate 104 and the current collecting plate 18, the uppermost electricity generation unit 102 of the fuel cell stack 100 does not have the upper interconnector 150, and the lowermost electricity generation unit 102 does not have the lower interconnector 150 (see FIGS. 2 and 3).

The unit cell 110 includes an electrolyte layer 112, and a cathode 114 and an anode 116 which face each other in the vertical direction (direction of array of the electricity generation units 102) with the electrolyte layer 112 intervening therebetween. The unit cell 110 of the present embodiment is an anode-support-type unit cell in which the anode 116 supports the electrolyte layer 112 and the cathode 114.

The electrolyte layer 112 is a member having an approximately rectangular flat-plate shape and is formed of a solid oxide which contains at least Zr; for example, YSZ (yttria-stabilized zirconia), ScSZ (scandia-stabilized zirconia), or CaSZ (calcia-stabilized zirconia). The cathode 114 is a member having an approximately rectangular flat-plate shape and is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is a member having an approximately rectangular flat-plate shape and is formed of, for example, Ni (nickel), a cermet of Ni and ceramic powder, or an Ni-based alloy. Thus, the unit cell 110 (electricity generation unit 102) of the present embodiment is a solid oxide fuel cell (SOFC) which uses a solid oxide as an electrolyte.

The separator 120 is a frame member which has an approximately rectangular hole 121 formed in a central region thereof and extending therethrough in the vertical direction, and is formed of, for example, a metal. A portion of the separator 120 around the hole 121 faces a peripheral portion of the surface on the cathode 114 side of the electrolyte layer 112. The separator 120 is bonded to the electrolyte layer 112 (unit cell 110) by means of a bonding member 124 formed of a brazing material (e.g., Ag brazing material) and disposed between the facing portion and the electrolyte layer 112. The separator 120 separates from each other the cathode chamber 166 which faces the cathode 114, and the anode chamber 176 which faces the anode 116, thereby preventing gas leakage from one electrode side to the other electrode side through a peripheral portion of the unit cell 110. The unit cell 110 to which the separator 120 is bonded is also called a separator-attached unit cell.

The cathode-side frame 130 is a frame member which has an approximately rectangular hole 131 formed in a central region thereof and extending therethrough in the vertical direction, and is formed of, for example, an insulator such as mica. The hole 131 of the cathode-side frame 130 partially constitutes the cathode chamber 166 which faces the cathode 114. The cathode-side frame 130 is in contact with a peripheral portion of the surface on a side opposite the electrolyte layer 112 of the separator 120 and with a peripheral portion of the surface on a side toward the cathode 114 of the interconnector 150. That is, the cathode-side frame 130 is disposed between the separator 120 and the interconnector 150 which are adjacent to each other in the direction of array. Also, the pair of interconnectors 150 contained in the electricity generation unit 102 are electrically insulated from each other by the cathode-side frame 130. Also, the cathode-side frame 130 has an oxidizer gas supply through hole 132 formed therein and adapted to establish communication between the oxidizer gas introduction manifold 161 and the cathode chamber 166, and an oxidizer gas discharge through hole 133 formed therein and adapted to establish communication between the cathode chamber 166 and the oxidizer gas discharge manifold 162.

A third glass seal material 56 formed through crystallization of a glass material is disposed within the through holes 108 of the cathode-side frame 130. Specifically, the third glass seal material 56 is disposed between the separator 120 and the interconnector 150 disposed adjacent to each other with the cathode-side frame 130 intervening therebetween, in such a manner as to surround the manifolds. The third glass seal material 56 electrically insulates from each other two electrically conductive members; specifically, the separator 120 and the interconnector 150, disposed adjacent to each other in the direction of array with the third glass seal material 56 intervening therebetween, and provides a gas seal between the separator 120 and the interconnector 150. Notably, the third glass seal material 56 corresponds to the glass seal member appearing in CLAIMS.

The anode-side frame 140 is a frame member which has an approximately rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface on a side toward the electrolyte layer 112 of the separator 120 and with a peripheral portion of the surface on a side toward the anode 116 of the interconnector 150. Also, the anode-side frame 140 has a fuel gas supply through hole 142 formed therein and adapted to establish communication between the fuel gas introduction manifold 171 and the anode chamber 176, and a fuel gas discharge through hole 143 formed therein and adapted to establish communication between the anode chamber 176 and the fuel gas discharge manifold 172.

The anode-side current collector 144 is disposed within the anode chamber 176. The anode-side current collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface on a side opposite the electrolyte layer 112 of the anode 116, and the interconnector facing portion 146 is in contact with the surface on a side toward the anode 116 of the interconnector 150. However, as described above, since the electricity generation unit 102 disposed at the lowermost position in the fuel cell stack 100 does not have the lower interconnector 150, the interconnector facing portion 146 in the lowermost electricity generation unit 102 is in contact with the surface of the current collecting plate 18. Since the anode-side current collector 144 is thus configured, the anode-side current collector 144 electrically connects the anode 116 and the interconnector 150 (or the current collecting plate 18) to each other. A spacer 149 formed of, for example, mica is disposed between the electrode facing portion 145 and the interconnector facing portion 146. As a result, the anode-side current collector 144 follows the deformation of the electricity generation unit 102 stemming from a temperature cycle and a pressure variation of reaction gas, thereby maintaining good electrical connection through the anode-side current collector 144 between the anode 116 and the interconnector 150.

The cathode-side current collector 134 is disposed within the cathode chamber 166. The cathode-side current collector 134 is composed of a plurality of current collector elements 135 each having an approximately rectangular columnar shape and is formed of, for example, ferritic stainless steel. The cathode-side current collector 134 is in contact with the surface on a side opposite the electrolyte layer 112 of the cathode 114 and with the surface on a side toward the cathode 114 of the interconnector 150. However, as described above, since the electricity generation unit 102 disposed at the uppermost position in the fuel cell stack 100 does not have the upper interconnector 150, the cathode-side current collector 134 in the uppermost electricity generation unit 102 is in contact with the surface of the first end plate 104. Thus, the cathode-side current collector 134 electrically connects the cathode 114 and the interconnector 150 (or the first end plate 104) to each other. Notably, the cathode-side current collector 134 and the interconnector 150 may be integrally formed as a unitary member. The fuel cell stack 100 corresponds to the electrochemical reaction cell stack appearing in CLAIMS. Also, the unit cell 110, the separator 120, the cathode-side frame 130, the cathode-side current collector 134, the anode-side frame 140, the anode-side current collector 144, and a pair of the interconnectors 150 which partially constitute the electricity generation unit 102, the end plates 104 and 106, the current collecting plate 18, the nuts 24, and the gas passage members 27 correspond to a plurality of structural members of the electrochemical reaction cell stack.

A-2. Operation of Fuel Cell Stack 100:

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the cathode chambers 166 through the oxidizer gas supply through holes 132 of the electricity generation units 102. Also, as shown in FIGS. 3 and 5, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the anode chambers 176 through the fuel gas supply through holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the unit cell 110 generates electricity through the electrochemical reaction between the oxidizer gas OG and the fuel gas FG. The electricity generating reaction is an exothermic reaction. In each electricity generation unit 102, the cathode 114 of the unit cell 110 is electrically connected to one interconnector 150 through the cathode-side current collector 134, whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the first protrusion 14 of the first end plate 104 and the second protrusion 16 of the current collecting plate 18 which function as output terminals of the fuel cell stack 100. Notably, in the SOFC, since electricity is generated at a relatively high temperature (e.g., 700° C. to 1,000° C.), the fuel cell stack 100 may be heated by a heater (not shown) from startup until the high temperature can be maintained by means of heat generated as a result of generation of electricity.

As shown in FIGS. 2 and 4, the oxidizer offgas OOG discharged from the cathode chambers 166 of the electricity generation units 102 is discharged to the oxidizer gas discharge manifold 162 through the oxidizer gas discharge through holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the anode chambers 176 of the electricity generation units 102 is discharged to the fuel gas discharge manifold 172 through the fuel gas discharge through holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

Figure 6:
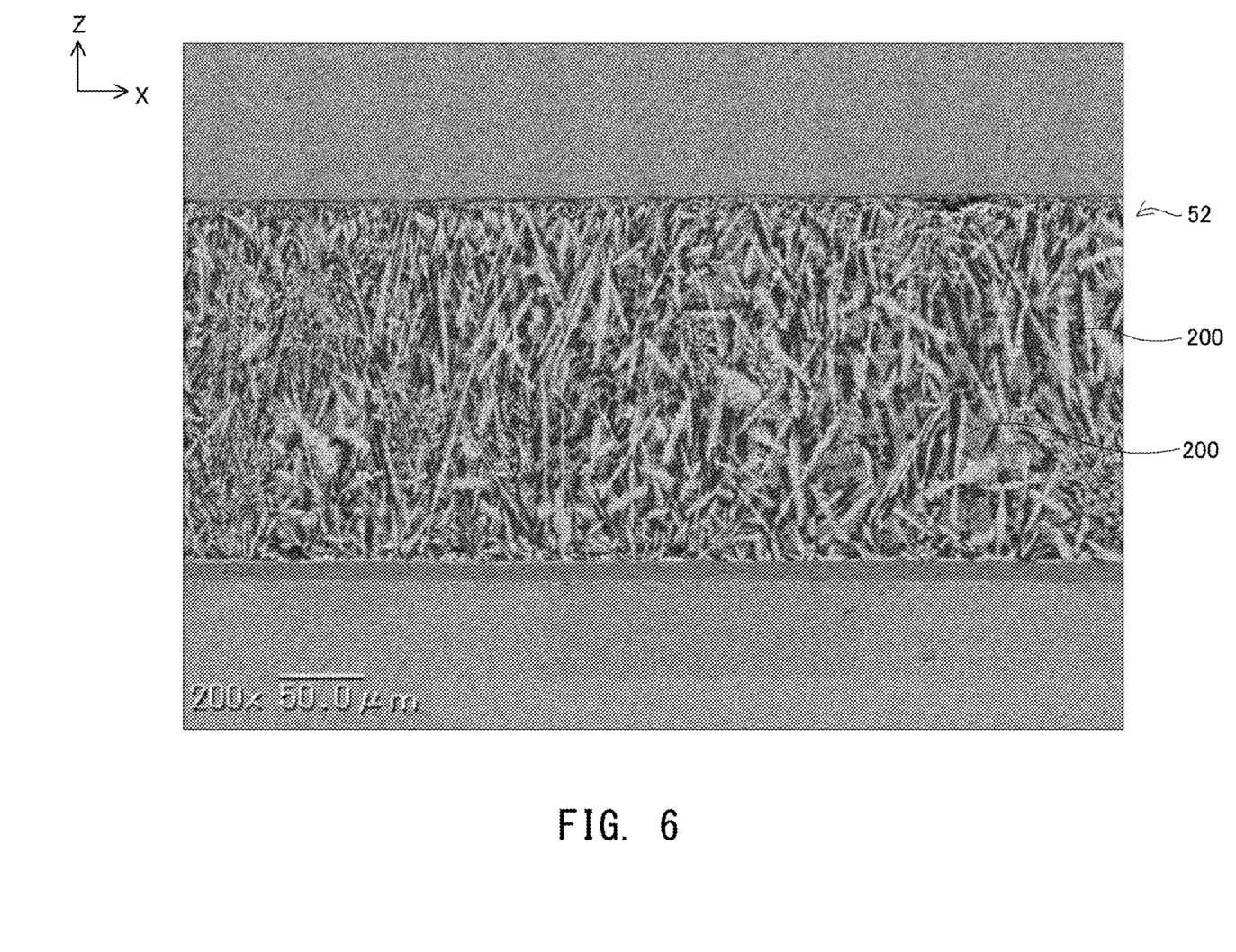
FIG. 6 Explanatory view showing the structure of a first glass seal material 52 of the present embodiment.

A-3. Detailed Structure of Glass Seal Materials 52, 54, and 56:

FIG. 6 is an explanatory view showing the structure of the first glass seal material 52 of the present embodiment. FIG. 6 shows the SEM image (200 magnifications) of an XZ section of the first glass seal material 52. Hereinafter, a dimension in the aforementioned direction of array (Z-axis direction, or the vertical direction of FIG. 6) is called a "vertical dimension," and a dimension in the planar direction (X-axis direction, or the horizontal direction of FIG. 6) orthogonal to the direction of array is called a "horizontal dimension."

As shown in FIG. 6, the first glass seal material 52 contains a plurality of vertically long crystal grains 200. The vertically long crystal grain 200 is a crystal grain extending in a needle shape and having a ratio of a vertical dimension to a horizontal dimension (=vertical dimension/horizontal dimension, hereinafter called an "aspect ratio") of 1.5 or more. That is, the vertically long crystal grain 200 is a crystal grain extending in a direction intersecting with a direction (X-axis direction and Y-axis direction; i.e., a gas leak path which could be formed between the two structural members) in parallel with the facing surfaces of two structural members in contact with the first glass seal material 52. Notably, the two structural members in contact with the first glass seal material 52 are the nut 24 engaged with the upper end of each bolt 22 and the first end plate 104; the second end plate 106 and each gas passage member 27; or each gas passage member 27 and the nut 24 engaged with the lower end of the corresponding bolt 22. Theses members correspond to the first structural member and the second structural member appearing in CLAIMS.

As shown in FIG. 6, a plurality of the vertically long crystal grains 200 include those having an aspect ratio in great excess of 1.5. More preferably, the aspect ratio of the vertically long crystal grain 200 is 3 to 10. Also, preferably, 50% or more of crystal grains contained in a unit area in the first glass seal material 52 are the vertically long crystal grains 200. Also, the vertical dimension of at least one vertically long crystal grain 200 is 30% or more of the vertical dimension (thickness in the direction of array) of the first glass seal material 52. Further, more preferably, the vertical dimension of at least one vertically long crystal grain 200 is 50% or more of the vertical dimension of the first glass seal material 52. Notably, the vertical dimension of the first glass seal material 52 can be determined as follows. There is captured an SEM image which contains both of the upper and lower ends of the first glass seal material 52; the positions of the upper and lower ends of the first glass seal material 52 are obtained on the basis of, for example, visual recognition or the difference in material between the first glass seal material 52 and the adjacent structural members (the first structural member and the second structural member), etc.; and the vertical dimension of the first glass seal material 52 can be determined from the distance between the obtained position of the upper end and the obtained position of the lower end.

Each of the second glass seal material 54 and the third glass seal material 56 also contains a plurality of the vertically long crystal grains 200. Notably, two structural members in contact with the second glass seal material 54 are the current collecting plate 18 and the second end plate 106; two structural members in contact with the third glass seal material 56 are the upper interconnector 150 and the separator 120; and these structural members correspond to the first structural member and the second structural member appearing in CLAIMS. Also, the glass seal materials 52, 54, and 56 correspond to the glass seal member appearing in CLAIMS.

Figure 7:
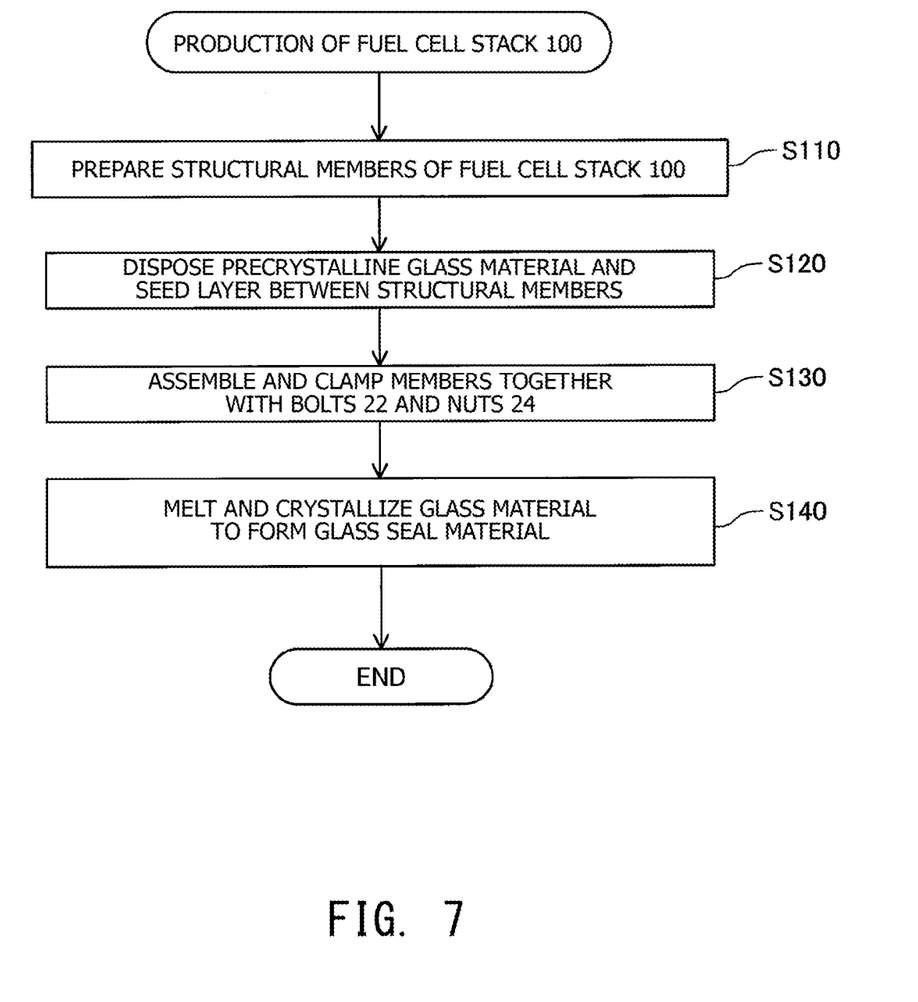
FIG. 7 Flowchart showing a production method for the fuel cell stack 100.

A-4. Production Method for Fuel Cell Stack 100:

FIG. 7 is a flowchart showing a production method for the fuel cell stack 100 having the above-mentioned structure. First, a plurality of the structural members (unit cells 110, separators 120, etc.) of the above-mentioned fuel cell stack 100 are prepared (S110). Next, a precrystalline glass material and a seed layer are disposed at positions (between two members between which a seal is provided) where the first glass seal material 52, the second glass seal material 54, and the third glass seal material 56 are to be formed (S120). The positions where the glass seal materials 52, 54, and 56 are to be formed are spaces between the first structural member and the second structural member which are adjacent to each other with the glass seal member 52, 54, or 56 intervening therebetween in the fuel cell stack 100. Specifically, the positions where the first glass seal material 52 is to be formed are spaces between the nuts 24 and the first end plate 104 or the second end plate 106, and spaces between the gas passage members 27 and the nuts 24 or the second end plate 106. The positions where the second glass seal material 54 is to be formed are spaces between the second end plate 106 and the current collecting plate 18. The positions where the third glass seal material 56 is to be formed are spaces between the separator 120 and the interconnector 150 disposed adjacent to each other with the cathode-side frame 130 intervening therebetween in each electricity generation unit 102.

The seed layer is formed of a substance which contains at least one element of Ba, Ca, Mg, Al, La, Ti, Cr, Zr, and Ce (the substance may be an oxide of such an element). Specifically, the seed layer is, for example, a coat layer formed of $TiO_2$ powder. The seed layer is disposed between the glass seal material 52, 54, or 56 and at least one of the first structural member and the second structural member. Specifically, the seed layer is formed on at least one of the facing surfaces of the first structural member and the second structural member. Notably, the seed layer may also be formed as follows: there is prepared a glass material which yields seed crystals containing the above elements contained in the seed layer; then, the seed crystals are yielded from the glass material by the heating process in S140 to be described later, thereby forming the seed layer. Also, in the step of preparation of the structural members (S110), there may be prepared the structural members having the seed layers formed beforehand on their facing surfaces.

Next, the structural members of the fuel cell stack 100 are assembled together and clamped together by means of the bolts 22 and the nuts 24 (S130). In this step, the bolts 22 are inserted through the respective through holes 108 formed in the members.

Next, the assembly resulting from the assembling of the members in S130 is heated at the softening temperature (e.g., 700 (° C.)) of the glass material, whereby the glass material melts; subsequently, the assembly is further heated at crystallization temperature (e.g., 850 (° C.)), whereby the glass material is crystallized. Also, in this step, elements contained in the seed layers function as seed crystals, thereby forming the abovementioned vertically long crystal grains 200 in the glass seal materials 52, 54, and 56. By performing the above steps, the fuel cell stack 100 having the above-mentioned structure is produced.

A-5. Advantageous Effects of the Present Embodiment:

The structural members of the fuel cell stack 100 thermally expand as a result of generation of heat associated with an electricity generating operation of the fuel cell stack 100 (electricity generation units 102). For example, the separator 120 and the interconnector 150 disposed adjacent to each other with the third glass seal material 56 intervening therebetween thermally expand. As a result of the thermal expansion of the separator 120, a tensile force acts on a lower-surface-side portion of the third glass seal material 56 adjacent to the separator 120 in such a manner as to stretch the lower-surface-side portion in a planar direction (direction in XY plane, hereinafter called the "horizontal direction") orthogonal to the facing direction of the separator 120 and the interconnector 150 (the aforementioned direction of array, hereinafter called the "vertical direction"). Also, as a result of the thermal expansion of the interconnector 150, a tensile force acts on an upper-surface-side portion of the third glass seal material 56 adjacent to the interconnector 150 in such a manner as to stretch the upper-surface-side portion in the horizontal direction.

Meanwhile, since the separator 120 and the interconnector 150 differ in coefficient of thermal expansion because of difference in material, the amount of thermal expansion differs therebetween. Accordingly, a force of stretching the lower-surface-side portion of the third glass seal material 56 in the horizontal direction as a result of thermal expansion of the separator 120 differs from a force of stretching the upper-surface-side portion of the third glass seal material 56 in the horizontal direction as a result of thermal expansion of the interconnector 150, causing generation of stress in the horizontal direction in the third glass seal material 56. As a result of generation of the stress in the horizontal direction in the third glass seal material 56, horizontal cracking extending in the horizontal direction is apt to occur in the third glass seal material 56. As a result of occurrence of the horizontal cracking, a gas leak path establishing communication between the cathode chamber 166 and the anode chamber 176 may be formed in the third glass seal material 56, potentially impairing sealing performance between the separator 120 and the interconnector 150.

By contrast, according to the present embodiment, the third glass seal material 56 contains a plurality of the vertically long crystal grains 200 having an aspect ratio of 1.5 or more. As a result, even though stress is generated in the horizontal direction in the third glass seal material 56 due to thermal expansion difference between the separator 120 and the interconnector 150, since, by virtue of the vertically long crystal grains 200, vertical cracking extending in the vertical direction is apt to occur in the third glass seal material 56 preferentially to horizontal cracking, and vertical cracking can release the horizontal stress, there can be restrained impairment of sealing performance between the separator 120 and the interconnector 150. Similarly, since the first glass seal material 52 and the second glass seal material 54 contain a plurality of the vertically long crystal grains 200, there can be restrained impairment of sealing performance between two structural members disposed adjacent to each other with the first glass seal material 52 or the second glass seal material 54 intervening therebetween, which could otherwise occur due to development of stress caused by the thermal expansion difference between the two structural members.

The present invention may be configured as follows.

"An electrochemical reaction cell stack comprising:

a plurality of unit cells each including an electrolyte layer, and a cathode and an anode facing each other in a first direction with the electrolyte layer intervening therebetween; and one or a plurality of structural members, the electrochemical reaction cell stack being characterized by further comprising a glass seal member which contains glass and is in contact with two members facing each other in the first direction, the two members being selected from the plurality of unit cells and the one or the plurality of structural members, and characterized in that the glass seal member contains a plurality of crystal grains each having a ratio of a vertical dimension in the first direction to a horizontal dimension in a second direction orthogonal to the first direction of 1.5 or more."

Also, the vertical dimension of at least one of the vertically long crystal grains 200 contained in the glass seal material 52, 54, or 56 is 30% or more of the vertical thickness of the glass seal material 52, 54, or 56. As a result, vertical cracking is apt to occur in the glass seal materials 52, 54, and 56 further preferentially to horizontal cracking, whereby there can be more effectively restrained impairment of sealing performance between two structural members disposed adjacent to each other with the glass seal material 52, 54, or 56 intervening therebetween. Preferably, the vertical dimension of at least one of the vertically long crystal grains 200 is 50% or more of the vertical thickness of the glass seal material 52, 54, or 56. As a result, even if horizontal cracking occurs, the development of the horizontal cracking is apt to be restrained by the vertically long crystal grains 200; consequently, there can be more effectively restrained impairment of sealing performance between the two structural members. Notably, the vertical thickness of the glass seal material 52, 54, or 56 is equal to the distance between vertically facing portions of the two members between which a seal is provided.

According to the production method for the fuel cell stack 100 of the present embodiment, a seed layer containing at least one element of Ba, Ca, Mg, Al, La, Ti, Cr, Zr, and Ce, and a glass material are disposed between two structural members disposed adjacent to each other with the glass seal material 52, 54, or 56 intervening therebetween; then, the glass material is melted, followed by crystallization. By this procedure, the glass seal materials 52, 54, and 56 containing the vertically long crystal grains 200 can be efficiently formed.

B. Modifications

The technique disclosed in the present specification is not limited to the above embodiment, but may be modified into various other forms without departing from the gist thereof. For example, the technique may be modified as described below.

In the above embodiment, the glass seal member is the glass seal material 52, 54, or 56 disposed between two mutually facing structural members. The glass seal member is not necessarily limited thereto; for example, the glass seal member may not be disposed between the two structural members while being in contact with the two structural members. For example, in FIG. 4, the glass seal member may be a glass seal material disposed in such a manner as to cover a right side surface of the bonding member 124 bonding the separator 120 and the unit cell 110, an upper surface and a right side surface of the separator 120, and an upper surface of the unit cell 110. Also, in place of the bonding member 124, the glass seal member may be used for bonding and providing a seal between the separator 120 and the unit cell 110. Further, both of the bonding member 124 and the glass seal material may be disposed between the separator 120 and the unit cell 110 for bonding and providing a seal between the separator 120 and the unit cell 110. Preferably, the glass seal material is disposed between mutually facing portions of the unit cell 110 and the separator 120. In the above case, the separator 120 corresponds to the structural member appearing in CLAIMS. The glass seal material corresponds to the glass seal member appearing in CLAIMS. In this case, the above-mentioned vertically long crystal grains 200 can be formed in the glass seal material by forming a seed layer on portions of the separator 120 and the unit cell 110 which the glass seal material is to come into contact with.

Also, at least one of the glass seal materials 52, 54, and 56 may not contain the vertically long crystal grains 200. Also, the glass seal materials 52, 54, and 56 may be partially formed of a material other than glass. In at least one section (e.g., the XZ section of FIG. 6) of the glass seal member (glass seal materials 52, 54, and 56) taken in parallel with the vertical direction, the percentage of area of the vertically long crystal grains 200 in a predetermined area of the glass seal member (hereinafter, called the area ratio of the vertically long crystal grains 200) is preferably 15% or more, more preferably 20% or more. The area ratio of the vertically long crystal grains 200 can be obtained by calculating the area of the vertically long crystal grains 200 contained in the predetermined area of the glass seal member in an SEM image of the section of the glass seal member.

In the above embodiment, two structural members in contact with the glass seal member are the nut 24 and the first end plate 104 or the second end plate 106; the gas passage member 27 and the nut 24 or the second end plate 106; the second end plate 106 and the current collecting plate 18; and the separator 120 and the interconnector 150. However, the two structural members are not limited thereto. For example, in the case of the fuel cell stack 100 in which the glass seal member is disposed between the separator 120 and the interconnector 150 or the current collecting plate 18, the separator 120 and the interconnector 150 or the current collecting plate 18 correspond to the two structural members.

The vertical dimension of the vertically long crystal grains 200 contained in the glass seal material 52, 54, or 56 may be less than 30% of the vertical thickness of the glass seal material 52, 54, or 56.

In S120 of the production method for the fuel cell stack 100 shown in FIG. 7, the seed layer may not be disposed. However, the disposition of the seed layer can more reliably form the vertically long crystal grains 200.

In the above embodiment, the number of the electricity generation units 102 contained in the fuel cell stack 100 is a mere example and is determined as appropriate according to a required output voltage or the like of the fuel cell stack 100.

In the above embodiment, spaces between the outer circumferential surfaces of shaft portions of the bolts 22 and the inner circumferential surfaces of the through holes 108 are utilized as manifolds. However, axial holes may be formed in the shaft portions of the bolts 22 for use as the manifolds. Also, the manifolds may be provided separately from the through holes 108 into which the bolts 22 are inserted.

In the above embodiment, in the case where two electricity generation units 102 are disposed adjacent to each other, the adjacent two electricity generation units 102 share a single interconnector 150. However, even in such a case, two electricity generation units 102 may have respective interconnectors 150. Also, in the above embodiment, the uppermost electricity generation unit 102 in the fuel cell stack 100 does not have the upper interconnector 150, and the lowermost electricity generation unit 102 in the fuel cell stack 100 does not have the lower interconnector 150. However, these interconnectors 150 may be provided without elimination.

In the above embodiment, the anode-side current collector 144 may have a structure similar to that of the cathode-side current collector 134; i.e., the anode-side current collector 144 and the adjacent interconnector 150 may be integrally formed as a unitary member. The anode-side frame 140 rather than the cathode-side frame 130 may be an insulator. Also, the cathode-side frame 130 and the anode-side frame 140 may have a multilayer structure.

In the above embodiment, materials used to form the members are provided merely by way of example. Other materials may be used to form the members.

In the above embodiment, the hydrogen-rich fuel gas FG is obtained by reforming city gas. However, the fuel gas FG may be obtained from other materials, such as LP gas, kerosene, methanol, and gasoline, or pure hydrogen may be utilized as the fuel gas FG.

In the present specification, a structure in which a member (or a certain portion of the member; the same also applies in the following description) B and a member C face each other with a member A intervening therebetween" is not limited to a structure in which the member A is adjacent to the member B or the member C, but includes a structure in which another component element intervenes between the member A and the member B or between the member A and the member C. For example, a structure in which another layer intervenes between the electrolyte layer 112 and the cathode 114 can be said to be a structure in which the cathode 114 and the anode 116 face each other with the electrolyte layer 112 intervening therebetween.

In the above embodiment, the fuel cell stack 100 has a structure in which a plurality of the flat-shape electricity generation units 102 are stacked. However, the present invention can be similarly applied to other structures such as a structure in which a plurality of substantially cylindrical fuel-cell unit cells are connected in series as described in International Publication No. WO2012/165409. In this case, two structural members in contact with the glass seal member may be, for example, a unit cell and a case (manifold) having a hole formed therein for allowing one end of the unit cell to be inserted into the hole. In this case, the glass seal member is disposed in such a manner as to be in contact with the inner wall surface of that hole of the case into which one end portion of the unit cell is inserted, and with the outer circumferential surface of the unit cell. The case corresponds to the structural member appearing in CLAIMS.

The above embodiment refers to SOFC for generating electricity by utilizing the electrochemical reaction between hydrogen contained in fuel gas and oxygen contained in oxidizer gas; however, the present invention is also applicable to an electrolysis cell unit which is the smallest unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2016-81813, detailed description thereof is omitted, but schematically, the electrolysis cell stack has a structure similar to that of the fuel cell stack 100 in the above embodiment. That is, the fuel cell stack 100 in the above embodiment may be read as "electrolysis cell stack," and the electricity generation unit 102 may be read as "electrolysis cell unit." However, in operation of the electrolysis cell stack, voltage is applied between the cathode 114 and the anode 116 such that the cathode 114 is a positive electrode (anode), whereas the anode 116 is a negative electrode (cathode), and water vapor is supplied as material gas through the through hole 108. As a result, the electrolysis of water occurs in the electrolysis cell units, whereby hydrogen gas is generated in the anode chambers 176, and hydrogen is discharged to the outside of the electrolysis cell stack through the through hole 108. Even in the electrolysis cell unit and the electrolysis cell stack having the above structures, impairment of the sealing performance between the two structural members, which would otherwise occur due to development of stress caused by the thermal expansion difference between the two structural members, can be restrained through employment of a structure similar to that of the above embodiment.

DESCRIPTION OF REFERENCE NUMERALS

14: first protrusion; 16: second protrusion; 18: current collecting plate; 22: bolt; 24: nut; 27: gas passage member; 28: body portion; 29: branch portion; 52, 54, 56: glass seal material; 57: insulating material; 100: fuel cell stack; 102: electricity generation unit; 104, 106: end plate; 108: through hole; 110: unit cell; 112: electrolyte layer; 114: cathode; 116: anode; 120: separator; 121: hole; 124: bonding member; 130: cathode-side frame; 131: hole; 132: oxidizer gas supply through hole; 133: oxidizer gas discharge through hole; 134: cathode-side current collector; 135: current collector element; 140: anode-side frame; 141: hole; 142: fuel gas supply through hole; 143: fuel gas discharge through hole; 144: anode-side current collector; 145: electrode facing portion; 146: interconnector facing portion; 147: connection portion; 149: spacer; 150: interconnector; 161: oxidizer gas introduction manifold; 162: oxidizer gas discharge manifold; 166: cathode chamber; 171: fuel gas introduction manifold; 172: fuel gas discharge manifold; 176: anode chamber; 200: vertically long crystal grains; FG: fuel gas; FOG: fuel offgas; OG: oxidizer gas; and OOG: oxidizer offgas.

The invention claimed is:

1. An electrochemical reaction unit comprising:
   a unit cell including an electrolyte layer, and a cathode and an anode which face each other in a first direction with the electrolyte layer intervening therebetween; and
   one or a plurality of structural members,
   the electrochemical reaction unit being characterized by further comprising a glass seal member which contains glass and is in contact with two members facing each other in the first direction, the two members being selected from the unit cell and the one or the plurality of structural members, and characterized in that
   the glass seal member contains a plurality of glass crystal grains each having a ratio of a vertical dimension in the first direction to a horizontal dimension in a second direction orthogonal to the first direction of 1.5 or more.

2. An electrochemical reaction unit according to claim 1, wherein
   the two members are the unit cell, and the structural member which at least partially faces the unit cell in the first direction.

3. An electrochemical reaction unit according to claim 2, wherein
   the structural member which faces the unit cell is a separator which has a through hole formed therein; whose portion around the through hole is joined to a peripheral portion of the unit cell; and which separates from each other a cathode chamber facing the cathode and an anode chamber facing the anode.

4. An electrochemical reaction unit according to claim 1, wherein
   the two members are a first structural member and a second structural member which face each other in the first direction.

5. An electrochemical reaction unit according to claim 4, wherein
   one of the first structural member and the second structural member is an interconnector.

6. An electrochemical reaction unit according to claim 1, wherein
   the vertical dimension of at least one of the glass crystal grains is 30% or more of a thickness of the glass seal member in the first direction.

7. An electrochemical reaction unit according to claim 1, wherein
the vertical dimension of at least one of the glass crystal grains is 50% or more of a thickness of the glass seal member in the first direction.

8. An electrochemical reaction cell stack comprising a plurality of electrochemical reaction units,
the electrochemical reaction cell stack being characterized in that at least one of the electrochemical reaction units is an electrochemical reaction unit according to claim 1.

9. A production method for an electrochemical reaction unit which includes
a unit cell including an electrolyte layer, and a cathode and an anode facing each other in a first direction with the electrolyte layer intervening therebetween,
one or a plurality of structural members, and
a glass seal member containing glass and being in contact with two members facing each other in the first direction, the two members being selected from the unit cell and the one or the plurality of structural members, and in which
the glass seal member contains a plurality of glass crystal grains each having a ratio of a vertical dimension in the first direction to a horizontal dimension in a second direction orthogonal to the first direction of 1.5 or more, the method comprising:

a step of preparing the unit cell and the one or the plurality of structural members;
a step of disposing between the two members a seed layer containing at least one element of Ba, Ca, Mg, Al, La, Ti, Cr, Zr, and Ce, and glass; and
a step of forming the glass seal member by, in a state in which the seed layer and the glass are disposed between the two members, melting the glass, followed by crystallization.

10. A production method for an electrochemical reaction unit according to claim 9, wherein
the two members are the unit cell, and the structural member which at least partially faces the unit cell in the first direction.

11. A production method for an electrochemical reaction unit according to claim 9, wherein
the two members are a first structural member and a second structural member which face each other in the first direction.

12. An electrochemical reaction unit according to claim 1, wherein the ratio is 1.5 or more and less than 10.

13. A production method for an electrochemical reaction unit according to claim 9, wherein the ratio is 1.5 or more and less than 10.

* * * * *